US012499111B1

(12) United States Patent
Paul et al.

(10) Patent No.: US 12,499,111 B1
(45) Date of Patent: Dec. 16, 2025

(54) COMPUTER-IMPLEMENTED METHOD, COMPUTER PROGRAM PRODUCT, AND COMPUTER SYSTEM FOR QUERY MANAGEMENT

(71) Applicant: Accenture Global Solutions Limited, Dublin (IE)

(72) Inventors: Nayanjyoti Paul, Edison, NJ (US); Atish Shankar Ray, Herndon, VA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/811,028

(22) Filed: Aug. 21, 2024

(51) Int. Cl.
*G06F 16/2453* (2019.01)

(52) U.S. Cl.
CPC ............... *G06F 16/24539* (2019.01)

(58) Field of Classification Search
CPC .................................. G06F 16/24539
USPC ........................................ 707/717
See application file for complete search history.

(56) References Cited

U.S. PATENT DOCUMENTS

| | | | |
|---|---|---|---|
| 11,562,143 B2 | 1/2023 | Priestas et al. | |
| 11,720,813 B2 | 8/2023 | Babu et al. | |
| 2023/0107309 A1 | 4/2023 | Patel et al. | |
| 2023/0245651 A1* | 8/2023 | Wang | G06N 5/022 |
| | | | 704/275 |
| 2024/0220465 A1* | 7/2024 | Sun | G06F 18/2323 |
| 2025/0278578 A1* | 9/2025 | Chawla | G06F 16/3331 |

FOREIGN PATENT DOCUMENTS

WO 2023030662 A 3/2023

OTHER PUBLICATIONS

Chattha, et al., "Create a Generative AI Gateway to Allow Secure and Compliant Consumption of Foundation Models," AWS Machine Learning Blog, Sep. 28, 2023, 10 pages.
Liu, et al., "Dynamic LLM-Agent Newtwork: An LLM-Agent Collaboration Framework with Agent Team Optimization," arXiv:2310.02170v1 [cs.CL] Oct. 3, 2023, 21 pages, retrieved Sep. 23, 2024 [https://arxiv.org/pdf/2310.02170.pdf].

(Continued)

*Primary Examiner* — Cam Y T Truong
(74) *Attorney, Agent, or Firm* — Polsinelli PC (57) ABSTRACT

The present disclosure discloses computer-implemented method, program product, and system for query management. The method incudes selecting a default Gen AI model for use with an application from a catalog of authorized Gen AI models. The method includes receiving a query and first determining, whether the query includes a request for information that is inappropriate. If the requested information is inappropriate, the query is submitted to an information source different from the authorized Gen AI models. If the requested information is appropriate the method includes second determining, whether the query meets any predetermined exception. If the query does not meet the any predetermined exception, the method includes second submitting, the query to the default Gen AI model. If the query meets any predetermined exception, then the method includes third submitting, the query to a different one of the authorized Gen AI models and transmitting an answer to the query.

20 Claims, 5 Drawing Sheets

(56) References Cited

OTHER PUBLICATIONS

Bigi, et al., "A fuzzy decision strategy for topic identification and dynamic selection of language models," Signal Processing, vol. 80, Issue 6, Jun. 2000, pages.

Kalai, et al., "On-line algorithms for combining language models," IEEE International Conference on Acoustics, Speech, and Signal Processing, 1999, 4 pages.

* cited by examiner

COMPUTER-IMPLEMENTED METHOD, COMPUTER PROGRAM PRODUCT, AND COMPUTER SYSTEM FOR QUERY MANAGEMENT

FIELD OF THE INVENTION

Various embodiments described herein relate generally to computer-implemented method, computer program product, and computer system for dynamically routing queries to an appropriate source.

BACKGROUND

Artificial Intelligence (AI) finds implementations in different use cases in the context of data processing. In the field of AI, Generative Artificial Intelligence (Gen AI) has recently seen an explosion in popularity. Gen AI includes foundation models that generate a variety of content including, but not limited to, text, images, audio, and video based on training data. Examples of the foundation models include Large Language Models (LLMs), which are a form of Gen AI that can be used to generate text for a variety of use cases. In some examples, LLMs can be integrated in digital assistants (e.g., chatbots) replacing traditional rule-based systems to provide responses to inputs received from a user. However, integrating Gen AI into enterprise platforms is a non-trivial task. For example, Gen AI can present various technical challenges and can have disadvantages that have to be managed.

SUMMARY

Implementations of the present disclosure generally propose a method and system for dynamic routing of queries to appropriate data source. The appropriate data source includes Generative Artificial Intelligence (Gen AI) models or information sources different from the Gen AI models. The queries are routed to the appropriate data source based on evaluation of information present in the query. Therefore, the queries are routed to the appropriate data source, while optimizing cost and accuracy of tasks performed based on the query.

In general, innovative aspects of the subject matter described in this specification provide a method for query management. The method includes selecting from a catalog of authorized Gen AI model, a default Gen AI model for use with an application. The method includes receiving a query for the application. Thereafter, the method incudes determining whether the query includes a request for information that is inappropriate for consideration by any of the authorized Gen AI models of the catalog. The method includes first submitting, in response to the first determining finding that the requested information is inappropriate, at least a portion of the query with the requested information to an information source different from the authorized Gen AI models of the catalog. In response to the first determining finding that requested information is appropriate, the method includes second determining whether the query meets any predetermined exception to submission to the default Gen AI model. In response to the second determining that the query does not meet the any predetermined exception, the method includes second submitting, in, the query to the default Gen AI model. In response to the second determining that the query meets any predetermined exception, the method includes third submitting the query to a different one of the authorized Gen AI model from the catalog. Finally, the method includes transmitting an answer to the query based on response to the first submitting, the second submitting, and/or the third submitting.

The present disclosure further describes a system for implementing the method provided herein. The present disclosure also describes computer-readable storage media coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF FIGURES

Various embodiments in accordance with the present disclosure will be described with reference to the drawings, in which.

Like reference numbers and designations in the various drawings indicate like elements.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example", "an example of", by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

With the advent of Generative Artificial Intelligence (Gen AI) systems, organizations are adopting Gen AI models to support execution of various processes throughout the organization. For example, a Gen AI model may support communications and interactions, and processes in software systems to support decision-making within the organizations. Multiple applications within a corporate network environment may use and interact with the Gen AI models to provide input and/or data for the execution of a wide variety of tasks, such as, human computer interactions (i.e., question-answer), automating process execution, process planning, generating step-by-step procedures for the process execution, performing data analysis, and/or the like. The Gen AI models may include foundation models/Large Language Models (LLMs).

The Gen AI models receive inputs primarily as text prompts/queries. The queries may be in textual format including instructions and/or queries together with contextual information, which guides the Gen AI models for generating responses to the queries.

Deploying a prior art Gen AI model for various use cases/applications and for all queries presents technical problems The prior art Gen AI models are designed to handle complex queries using an extensive list of parameters, which will require an appropriate amount of time to answer the question based on the parameters and consume an extensive amount of power for each query. But such a design is overpowered for a simple query, which still counts as a query and consumes the same power and computer resources as a complicated query. There may also be a limit on the number allowed queries, which again does not distinguish between complex and simpler queries, such that simpler queries needlessly consume resources.

According to implementations of the present disclosure, the proposed disclosure addresses the challenges by enabling dynamic routing of queries to Gen AI models selected from a catalog or to different information sources. The routing of the queries is decided by determining whether information requested in the prompt is appropriate for the Gen AI models or the different information sources and whether the queries meet any predetermined exceptions for submission to the Gen AI models. Therefore, the queries are routed to the appropriate Gen AI models or any different information sources, which optimizes resource allocation and processing efficiency. Further, as the appropriate Gen AI models or information sources are selected for the queries, the queries are resolved with faster response time and without quota exhaustion of the Gen AI models, which makes the proposed routing of queries as cost-effective, efficient, and scalable.

Figure 1:
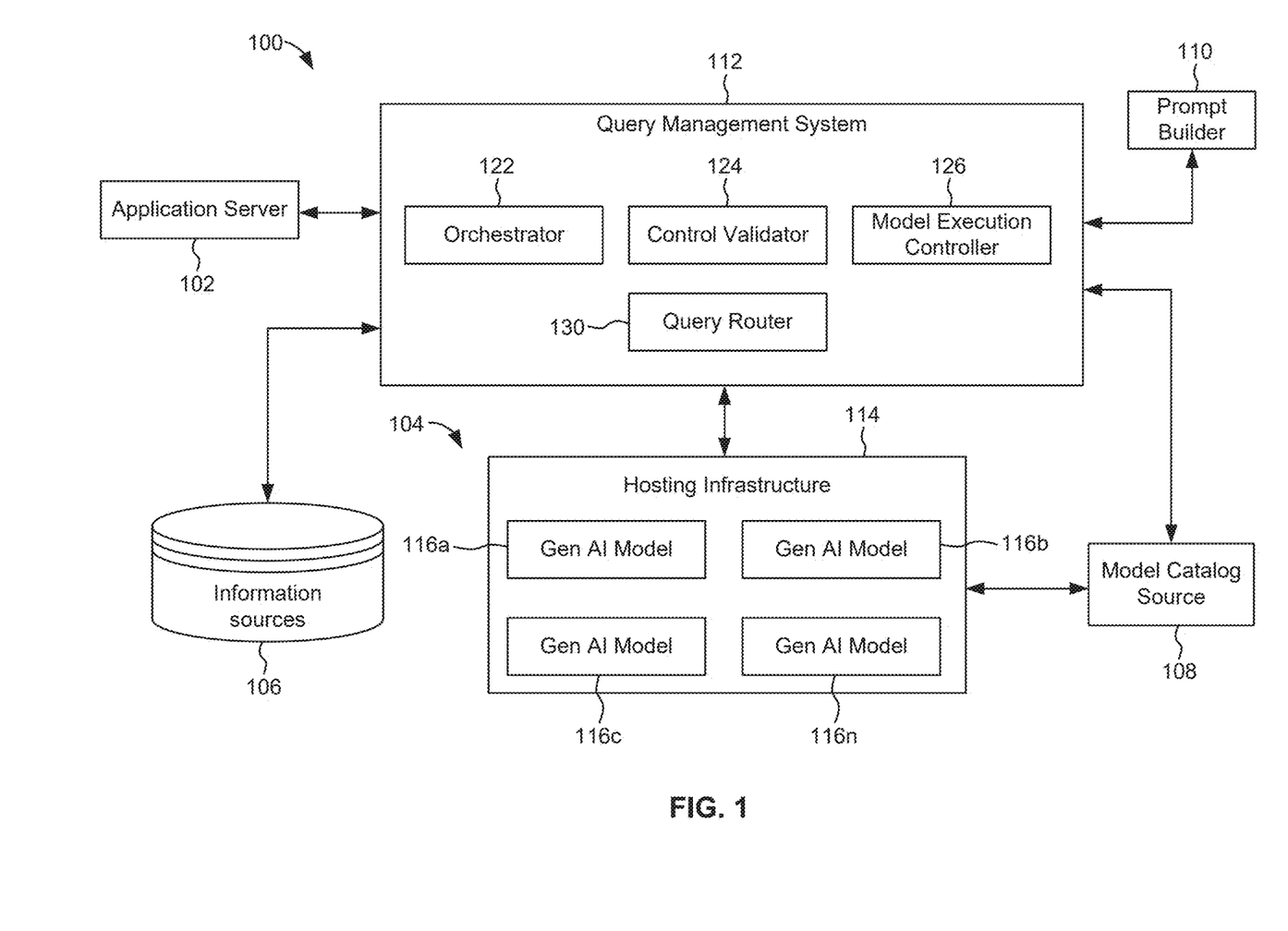
FIG. 1 depicts an example environment that may be used to execute implementations of the present disclosure.

FIG. 1 depicts an example environment 100 that may be used to execute implementations of the present disclosure. In the example of FIG. 1, the example environment 100 includes one or more application servers 102, a Generative Artificial Intelligence (GAI) system 104, information sources 106, a model catalog source 108, a prompt builder 110, and a query management system 112.

Each of the application servers 102 executes one or more applications that consume the GAI system 104 being implemented by enterprise systems. In an example, an application may include a chatbot that provides responses generated by the GAI system 104 responsive to queries provided by users to the chatbot. The queries may indicate a domain and/or one or more tasks to be performed using the GAI system 104. Examples of the tasks may include text generation, text translation, question answering, code generation, process planning, process execution, data analysis, reasoning, and/or the like. The response(s) generated responsive to the query may indicate results of the tasks being performed using the GAI system 104. In another example, the application may include any application that enables interactions with the GAI system 104 through the query management system 112 with different modalities. Examples of the modalities may include text, audio, image, video, and/or the like.

The GAI system 104 may be implemented by the enterprise systems for performing the tasks. The GAI system 104 includes a hosting infrastructure 114 to host one or more Gen AI models/foundation models 116a-116n. It should be noted that the GAI system 104 may also include other components such as knowledge base, rules engine, and/or the like (not shown). The knowledge base includes domain knowledge associated with processes that may be executed using the Gen AI models 116a-116n.

The hosting infrastructure 114 represents technical infrastructure(s), where the Gen AI models 116a-116n are hosted. Examples of the hosting infrastructure 114 may include cloud computing platforms or the like. In some examples, the hosting infrastructure 114 may host the Gen AI models 116a-116n in different types of paradigms, which include, without limitation, model-as-a service (MaaS) models, specialized MaaS (SMaaS) models, self-deployed models, and/or the like.

In some examples, the Gen AI models 116a-116n may be provided by one or more third parties or the enterprise systems hosting the applications on the application server 102. A Gen AI model 116a-116n receives the requests/queries and provides the responses to the query management system 112 of the present disclosure. For example, the requests/queries may be received from the query management system 112 as prompts through an Application Programming Interface (API).

The Gen AI model 116a-116n may be described as a general-purpose GAI model like large deep learning neural network. The large deep learning neural network may be trained using a broad range of generalized, unlabeled training data and that may perform the tasks. In some examples, the applications may be built on top of the Gen AI models 116a-116n and the Gen AI models may be used to perform a range of functionality for the application.

The Gen AI models 116a-116n may include, for example, Large Language Models (LLMs), which are a form of GAI that may be used to generate text for a variety of use cases. In some examples, the LLMs may be integrated in digital assistants (for example, chatbots), replacing traditional rule-based systems to provide textual responses to a user input. A LLM may be described as an advanced type of language model that is trained using deep learning techniques on massive amounts of text data. The text data is general and not specific to any particular domain. A LLM may described as an advanced type of language model that is trained using deep learning techniques on massive amounts of text data. The text data is general and not specific to any particular domain. The LLMs may generate human-like text and perform various Natural Language Processing (NLP) tasks (for example, translation, question-answering, and/or the like). In some examples, the LLM refers to models that use deep learning techniques and have a plurality of parameters, which may range from millions to billions. The LLMs may capture complex patterns in language and produce text that is often indistinguishable from that written by humans. The produced text may be processed through a deep learning architecture such as, recurrent neural network (RNN), a transformer model, and/or the like.

While implementations of the present disclosure are described in further detail herein with non-limiting reference to the LLMs as the example Gen AI models, it is contemplated that implementations of the present disclosure may be realized using any appropriate foundation models or Machine Learning (ML) models, or Artificial Intelligence (AI) models. Such models may generate the content/response based on any appropriate modality (for example, text, audio, image, video, and/or the like). In some examples, the response may correspond to one or more of the tasks being represented by the request/prompt.

It should be noted that the present disclosure may be realized using different types of Gen AI models such as various LLMs authorized to be used with applications. For example, SaaS Based LLM are available as Application Programming Interface (API) from Azure, including, but not limited to, GPT-3.5 and GPT-4 wrappers that allow web applications to interact with the corresponding large language models from Gen AI. Third party LLMs available as APIs, for example, Cohere and Scale AI, including, but not limited to, Software as a service (SAAS) based LLM available from Other Cloud Service Provider (CSP). A Load Balancer is provided to distributes traffic among cloud service providers (CSPs) for example Amazon Web Services (AWS) and Google Cloud Platform (GCP). Fine Tuned Models are available from Azure such as, but not limited to, fine-tuned inference APIs from Azure for custom large language models.

In some examples, the Gen AI models 116a-116n referred herein may be trained models to perform the intended functions. The Gen AI models 116a-116n may be trained using various learning methods such as a supervised learning method, an unsupervised learning method, and/or the like. In some examples, the Gen AI models 116a-116n may be trained based on training datasets, which include historical queries and associated domain and complexity, clusters of similar queries, and/or the like.

In some examples, information about the Gen AI models 116a-116n may be registered in the model catalog source 108 once the Gen AI models 116a-116n are deployed in the hosting infrastructure. The Gen AI models 116a-116n may be registered in the model catalog source 108 based on a successful authorization of the Gen AI models 116a-116n. The model catalog source includes the information about the Gen AI models 116a-116n in a form of catalog. The catalog may include applications that can be executed by the Gen AI models 116a-116n, functional values of each of the Gen AI models 116a-116n (for example, latency, accuracy, cost, or the like), and/or the like. Therefore, the model catalog source 108 includes the information about the authorized Gen AI models, which can be used for multiple applications/tasks.

In some examples, the prompt builder 110 enables building of the prompts for querying the Gen AI models 116a-116n. The prompts may be built using a set of prompt templates. For example, a library of prompt templates may be maintained, and each prompt template provides a pattern that is specific to the Gen AI model 116a-116n. In some examples, the prompt builder 110 enables the users to build and experiment with the prompts and compare the responses across the multiple Gen AI models 116a-116n. In such a way, the users may consider the quality of responses and quantitatively determine cost and latency to use of the respective Gen AI models 116a-116n.

In some implementations, each of the application servers 102 executes one or more applications that consume the different information sources 106 being implemented by enterprise systems. The information sources 106 are different from the authorized Gen AI models of the catalog. For example, an information source 106 may be a traditional database, a specific web search engine, a database compiled by experts in specific domains, stored memory, a cache memory, and/or the like. The traditional database may include verified information on range of topics. The specific web search engine may include the broader internet for relevant information. The database compiled by experts in specific domains may include database related to a specific domain (e.g., scientific data).

In some examples, the query management system 112 may be implemented as an on-premises system that is operated by the enterprise or a third-party engaged in cross-platform interactions and data management. In some examples, the query management system 112 may be implemented as an off-premises system (for example, cloud or on-demand) that is operated by the enterprise or a third-party on behalf of the enterprise. In some examples, the query management system 112 may be implemented in a cloud environment. Further, the query management system 112 may be intended to represent various forms of servers including a web server, a proxy server, a network server, a server pool, and/or the like.

The query management system 112 may include one or more processors (not shown) such as, but not limited to, microprocessors, microcomputers, microcontrollers, digital signal processors, central processing units, state machines, logic circuits, and/or any devices that manipulate data or signals based on operational instructions. Among other capabilities, the processor may fetch and execute computer-readable instructions in a memory operationally coupled with the query management system 112.

In accordance with implementations of the present disclosure, the query management system 112 enables dynamic routing of queries to an appropriate data source. The appropriate data source includes one of the Gen AI models 116a-116n or the information source 106.

The query management system 112 includes an orchestrator 122, a query router 130, a control validator 124 and a model execution controller 126.

The orchestrator 122 handles the requests to the query management system 112 (for example, from the applications executed on the application server(s) 102) for comparing, routing, and the like, by orchestrating execution of a suite of granular services and functions.

The control validator 124 identifies controls that are to be applied while making the requests to the Gen AI models 116a-116n for enforcing governance policies.

The model execution controller 126 enables browsing, sending of instructions to the query router 130 for model comparisons, selections and composing of rules for executing the Gen AI models 116a-116n in the production environment.

The query router 130 receives the query(ies) from the application(s) being executed on the application server. The query router 130 selects the data source for processing the received query. In implementations of the present disclosure, the data source includes the Gen AI model 116a-116n or the information source 106.

For selecting the data source for processing the query, the query router 130 identifies the authorized Gen AI models registered in the model catalogue source 108. From the authorized Gen AI models, the query router 130 selects a default Gen AI model for use with the application. Further, the query router 130 first determines if the query includes a request for information that is inappropriate for consideration by any of the authorized Gen AI models 116a-116n. If it is determined that the query includes the request for information that is inappropriate, the query router 130 routes the query to the information source 106 different from the authorized Gen AI models 116a-116n. If it is determined that the query includes the request for information that is appropriate, the query router 130 determines if the query meets any predetermined exception to submission to the default Gen AI model. If the query does not meet any predetermined exception, the query router 130 routes the query to the selected default Gen AI model. If it is determined that the query meets any predetermined exception, the query router 130 routes the query to one of the authorized Gen AI models 116a-116n (i.e., different from the default Gen AI model).

Further, the query router 130 retrieves responses from the information source 106 or the default Gen AI model or one of the authorized Gen AI models 116a-116n, for which the query has been routed. The query router 130 provides the retrieved responses as answers to the application from which the query has been received.

Various examples depicting routing of the queries are described in detail in conjunction with figures below.

Figure 2:
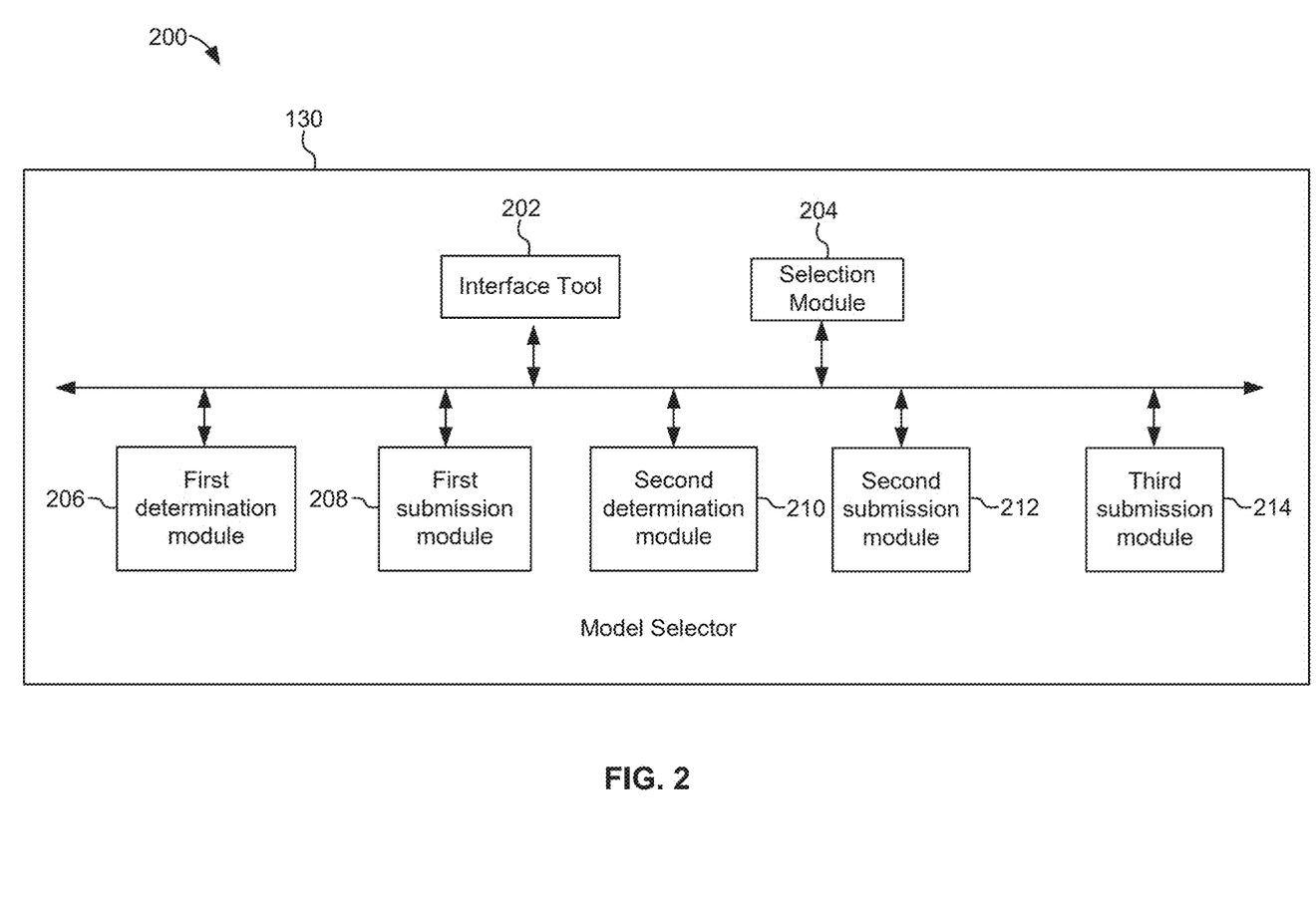
FIG. 2 depicts a block diagram of an example query router of a query management system in accordance with implementations of the present disclosure.

FIG. 2 depicts an example block diagram of the query router 130 including components for dynamic routing of the queries in accordance with implementation of the present disclosure. The query router 130 includes an interface module 202, a selection module 204, a first determination module 206, a first submission module 208, a second determination module 210, a second submission module 212, and a third submission module 214.

The interface module 202 receives the catalog from the model catalogue source 108. The catalog identifies the information about the authorized Gen AI models 116a-116n registered in the model catalogue source 108.

Based on the catalog received from the model catalog source 108, the selection module 204 selects a default Gen AI model from the authorized Gen AI models 116a-116n for use with an application. For example, consider that fifteen Gen AI models are registered in the catalog intended for different applications. The selection module 204 determines out of the fifteen Gen AI models which model is best for which application. For example, a first model is best suited for an insurance related application and a second model is best suited for a finance related application, or the like.

In some examples, the selection module 204 may select the default Gen AI model based on ground truth evaluation and accuracy. For selecting the default Gen AI model, the selection module 204 obtains ground truth from subject matter/domain experts and key performance indicators (KPIs) associated with Gen AI models. In some examples, the ground truth may include questions and corresponding answers received from the subject matter/domain experts/certified vendors, crowd sourcing data (collected from different domain experts/certified vendors over the time), and/or the like. The KPIs are set of metrics, for example, perplexity, BiLingual Evaluation Understudy (BLEU) score, bias, soundness, ethical corrections, grammatical corrections, sentiments, or the like, for evaluating the performance of the Gen AI models 116a-116n, in providing responses to the queries. Upon obtaining the ground truth and the KPIs, the selection module 204 performs evaluation on the KPIs to evaluate questions/prompts provided to the Gen AI models 116a-116n and answers received from the Gen AI models in response to the questions. The selection module 204 compares the evaluation with the ground truth. Based on the comparison, the selection module 204 generates graphs, charts, visuals, and/or the like, which may indicate the Gen AI models suitable/appropriate for the application.

In some examples, the selection module 204 may select the default Gen AI model for use with the application based on the functional values of the authorized Gen AI models 116a-116n registered in the model catalog source 108. Examples of the functional values may include quota, size, volume, and cost of usage.

In some examples, the selection module 204 may select the default Gen AI model for use with the application based on application requirements, unit testing to be performed on the application, and enterprise requirements for the application adoption.

Also, the interface module 202 receives the query for the application. In an example, the interface module 202 may receive the query from the application being executed on the application server 102. For instance, the query "What is endowment policy" may be received from an insurance related application.

Further, the query includes information for performing one or more tasks. For example, the one or more tasks may include translation, reasoning, summarization, question-answering, and/or the like. In some examples, the query is static or dynamic in nature. Static query is received from a user and undergoes processing without any modification. The dynamic query may undergo modification during processing. This allows for the dynamic adjustment of the query based on initial analysis and potentially improve its suitability for specific Gen AI models.

Upon receiving the query, the first determination module 206 determines whether the query includes a request for the information that is inappropriate for consideration by any of the authorized Gen AI models 116a-116n registered in the model catalog source 108.

In an example, the query may be considered inappropriate if the information is already available in the information source 106 (for example, stored memory). For example, if the question is "What were our sales last year?", sales data may be resident in stored memory as part of the company's setup.

In another example, the query may have been previously answered by the Gen AI model, such that the answer is resident in stored memory or cache. The first determination module 206 recognizes this as query was previously submitted and the answer should be resident in appropriate storage. Since the answer is readily available in the stored memory, the first determination module 206 determines the query is inappropriate for consideration by any of the Gen AI models 116a-116n.

In another example, the query may be considered inappropriate if the requested information being considered is unavailable to any of the authorized Gen AI models registered in the model catalog source 108. For instance, consider that the query is "What is the meaning of life?". In such an instance, the first determination module 206 analyzes the query and determines that the query is a philosophical question outside the capabilities of any Gen AI models 116a-116n registered in the model catalog source 108. Therefore, the first determination module 206 determines that the query is inappropriate for consideration by any of the Gen AI models 116a-116n.

Once it has been determined that the query includes the information that is inappropriate for consideration by any of the Gen AI models 116a-116n, the first submission module 208 routes/submits (i.e., first submitting) the query with the requested information to the information source 106 different from the authorized Gen AI model. The information source 106 includes non-Gen AI model, non-Gen AI query system, a memory, a cache memory, a database, and/or the like. Routing/submitting the query may include requesting information/answers that have been stored in the information source 106.

Upon determining that the query includes the request for information that is appropriate, the second determination module 210 determines whether the query meets any predetermined exception to submission to the default Gen AI model.

The second determination module 210 analyzes the query to determine if the query falls under a predefined category of exceptions. The predefined category of exceptions represents specific types of queries to be processed by an alternative model (herein after referred to as specialized model) from the authorized Gen AI models of the catalog. The alternative model is one of authorized Gen AI models other than the default Gen AI model selected by the selection module 204 for the application. The alternative model may require less resources and less parameters (i.e., parameters of the model such as activation/bias functions, batch size, epochs, and/or the like) to answer the query compared to the default Gen AI model. Therefore, the alternative model may answer the query with minimal cost and time. It should be noted that the query falling under the predefined category of exceptions may include a complex query, which can be processed faster using any specialized Gen AI models 116a-116n registered in the model catalog source 108 with less resources, less parameters of the Gen AI models 116a-116n and low cost. For example, the queries related to specific applications/areas like finance, medicine, legal issues, or the like may be processed using the specialized Gen AI models 116a-116n trained specifically for such applications. Similarly, the query falling outside the predefined category of exceptions (i.e., does not meet any predefined category of exceptions) may be considered as a simple query, which may be processed using any random Gen AI models 116a-116n registered in the model catalog source 108, for example, the default Gen AI model selected by the selection module 204 for use with the application.

If the second determination module 210 determines that the query does not meet any predefined exceptions, the second submission module 212 routes/submits the query to the default Gen AI model selected by the selection module 204 for the associated application.

Routing/submission by the second submission module 212 (i.e., second submitting) involves submitting the query along with any requested information returned from the routing/submission of the query by the first submission module 208 to the default Gen AI model.

If the second determination module 210 determines that the query meets any predetermined exception, the third submission module 214 routes the query to the alternative model/specialized Gen AI model (i.e., different from the default Gen AI model) of the authorized Gen AI models 116a-116n.

For example, a query like "What is endowment policy?" does not fall under predefined exceptions. Therefore, such a query is routed to the default Gen AI model. For another example, a query like "what will be the changes to insurance premium amount after filing a car theft claim" meets the predefined category of exceptions, as the query may require complex insurance amount calculation. Therefore, such a complex query may be routed to the alternative Gen AI model, which is selected for the associated application.

Therefore, with the proposed implementations of the present disclosure, the query may be routed to the appropriate data source based on a nature, a complexity, and historical trends of the query.

Finally, the interface module 202 receives the responses from the information source 106, or the default Gen AI model, or the alternative Gen AI model. The query router 130 retrieves responses from the information source 106 or the default Gen AI model or the alternative Gen AI model, for which the query has been routed.

Consider an example scenario, wherein the selection module 204 selects a Gen AI model 116a as the default Gen AI model from the authorized Gen AI models 116a-116n present in the catalog. Further, the interface tool 202 receives a query like "What is total revenue generated in the year 2023". In such a scenario, the first determination module 206 determines that the query includes the information that is inappropriate for consideration by any of the authorized Gen AI models 116a-116n. The first submission module 208 routes/submits the query to the information source 106.

Further, the interface tool 202 receives a query like "Where the Mexico City is situated". In such a scenario, the first determination module 206 determines that the query includes the information that is appropriate for consideration by any of the authorized Gen AI models 116a-116n. Thereafter, the second determination module 210 determines that the query does not fall under any predefined exceptions. Due to which, the second submission module 212 submits/routes the query to the default Gen AI model 116a.

Further, the interface tool 202 receives a query like "How the loan amount is calculated". In such a scenario, the first determination module 206 determines that the query includes the information that is appropriate for consideration by any of the authorized Gen AI models 116a-116n. Thereafter, the second determination module 210 determines that the query falls under the predefined exception category. Due to which, the third submission module 214 submits/routes the query to the alternative model, which is different from the default Gen AI model 116a. In an example herein, the alternative model is a Gen AI model intended for finance related tasks/operations.

Figure 3:
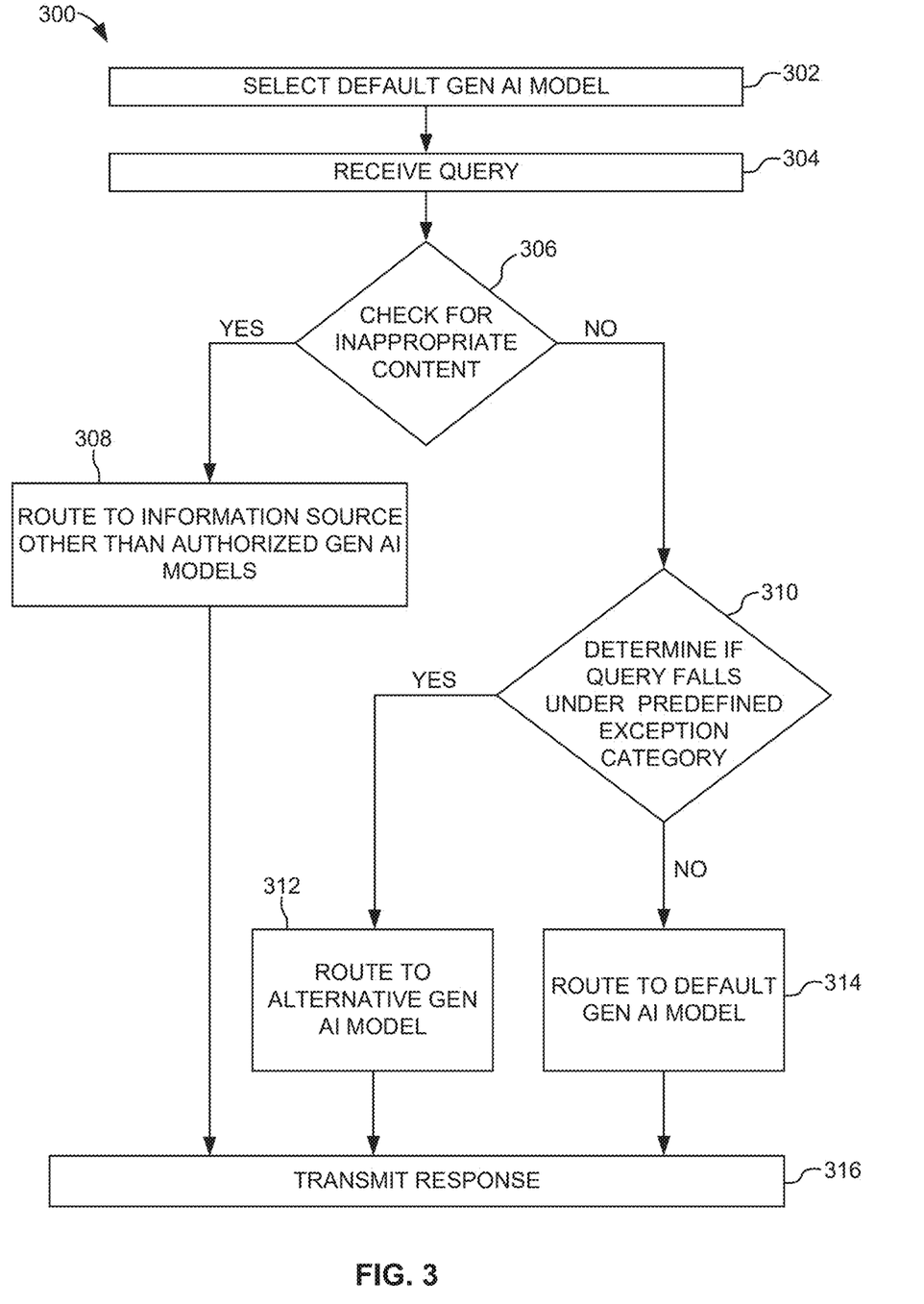
FIG. 3 is a flow diagram that presents an example method for dynamic routing of queries in accordance with implementations of the present disclosure.

FIG. 3 is a flow diagram that presents an example method example method 300 for dynamic routing in accordance with implementations of the present disclosure. In some examples, the example method 300 is executed using the query router 130, the information source 106, the Gen AI models 116a-116n and the model catalog source 108, described in FIGS. 1 and 2.

At step 302, a default Gen AI model is selected from the catalog of authorized Gen AI models 116a-116n registered for use with an application.

At step 304, a query is received from the user for the application. The query is static or dynamic in nature, wherein dynamic queries can be processed and modified before being sent to the Gen AI models 116a-116n or the information source 106. Further the query in the present disclosure encompasses both the original query received from the user and any modifications it undergoes during processing. The processing includes shortening or rephrasing the query to improve clarity and, extract key entities or keywords from the query or identify and remove irrelevant information. In an example, a user submits the query "What is the capital of France and its population?" the key entities extracted are like "France" and "capital" from the query. This allows focusing on retrieving relevant information instead of processing the entire sentence.

In another example, if the user submits a query "Best restaurant near me?", location information may be added if not explicitly provided (e.g., "Best restaurant near my current location?") the query is rephrased for better model understanding (e.g., "What are the highly rated restaurants in my vicinity?").

Thus, by dynamically tailoring the query, the complexity of the query is reduced. Further, the response time is improved. Moreover, this minimizes the need to use the most powerful (and expensive) open Gen AI models for every query. The system can provide more relevant and informative answers to users.

At step 306, the method includes first determining whether the query includes a request for information that is inappropriate for consideration by any of the authorized Gen AI models of the catalog.

The query router 130 determines the requested information to be inappropriate if the answer to the query already being available in a stored memory as an answer to an earlier query, or if the requested information being considered unavailable to any of the Gen AI models of the catalog. There are instances, where the query may include the information appropriate for the information source 106 (for example, Customer relationship management (CRM) or external third-party database) rather than the Gen AI models 116a-116n. In such a scenario, the query may be considered as inappropriate for consideration by the Gen AI models 116a-116n. For example, the query like "How many casual leaves are left for me?" may include the information to be considered as appropriate for any Human Resource (HR) database rather than the Gen AI models 116a-116n.

If the query includes the information that is inappropriate for the Gen AI models 116a-116n, at step 308, the query is routed to the information source 106 other than authorized Gen AI models that can handle the query. For example, if a user submits a query to an application "How to build a bomb?", the query is analyzed, and "bomb" is identified as inappropriate information for Gen AI models due to safety concerns. Since the query contains inappropriate content ("bomb"), at least a portion of the query, for example, "How to build something?" or "Alternatives to destructive devices?", is routed to the designated information source 106 other than authorized Gen AI models 116a-116n, suitable for handling such requests. For example, the designated information source, for example web search engine.

Thereafter, if the query is appropriate, at step 310, the query is analyzed to determine if the query falls under predefined category of exceptions. These exceptions are specific types of queries requiring the alternative/specialized Gen AI models. (e.g., financial advice requiring a finance model).

If the query falls under the predefined exception category, at step 312, the query is routed to the alternative/specialized Gen AI model registered in the catalog for the specific application. For example, if the user query is "What is the best stock to invest in right now?", the query is analyzed to fall under the predefined exception category of "financial advice.". Since the query matches the "financial advice" exception, the query is routed to the specialized Gen AI model. In an example herein, the specialized Gen AI model is a Gen AI model intended for performing finance related operations.

If the query does not fall under a predefined exception category, at step 314, the query is routed to the default Gen AI model.

At step 316, a response (answer), based on the routing in steps 306 to 314, is retrieved. Herein, the response may generate from the information source 106, the specialized Gen AI model, or the default Gen AI model. The generated response is transmitted to the user.

The above methodology provides a technical solution to the technical problems of the prior art. In the prior art, all of the queries are sent to the default Gen AI model, whereas in the above methodology only some are while others are sent to other information sources or simpler AI models. These other information sources and/or simpler AI models consume less computer resources and power than the default Gen AI model, resulting in an overall reduction in power consumption and computer resource usage. Also, queries that go to these other information sources and/or simpler AI models do not count against any quota of the default Gen AI model, such that the default Gen AI model is available for additional complex questions beyond that of the prior art.

Figure 4:
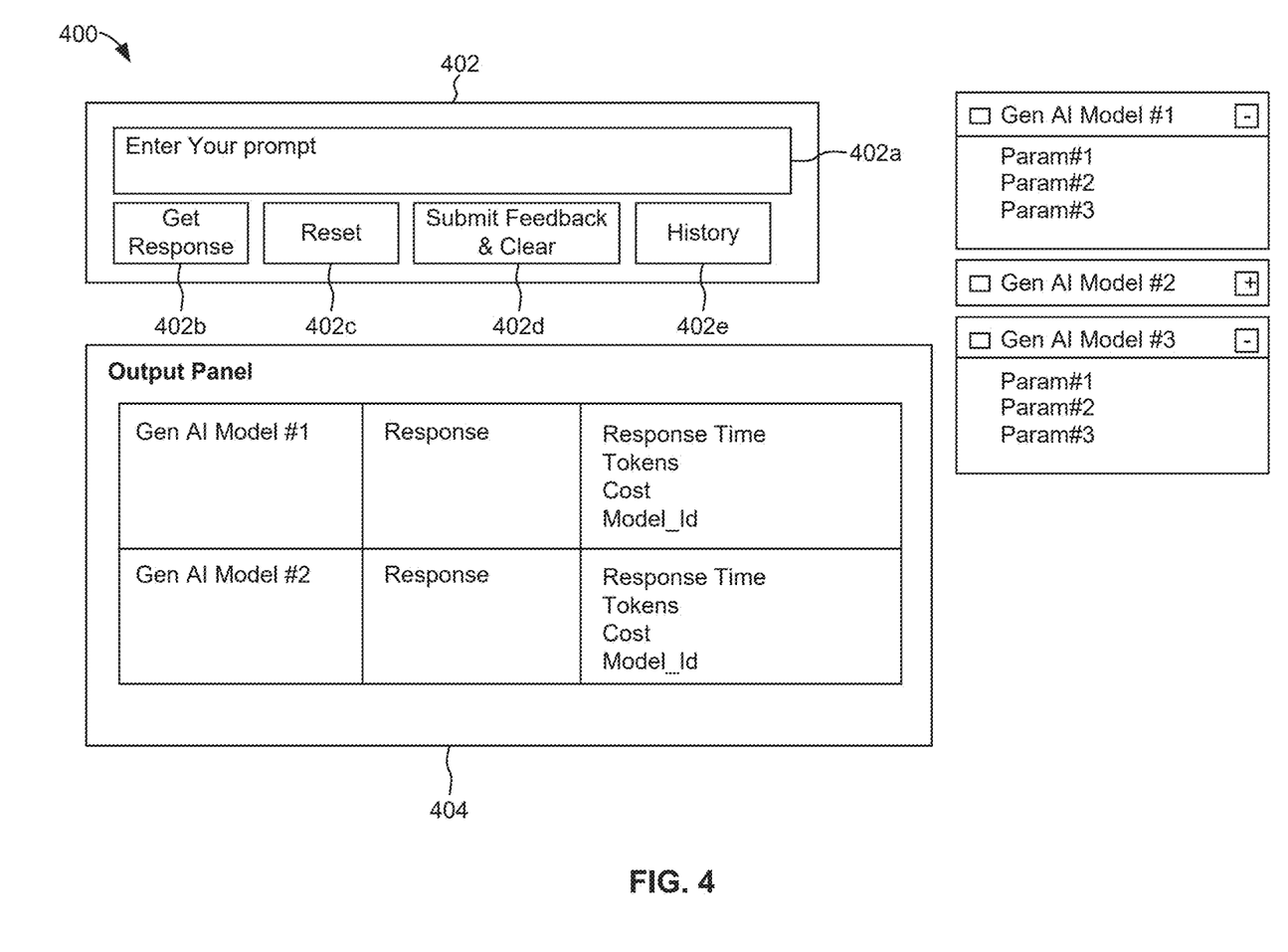
FIG. 4 illustrates an example user interface (UI) screen of the application executed on a user device for inputting a query and receiving a response to the query in accordance with implementations of the present disclosure.

FIG. 4 illustrates an example user interface (UI) screen of the application executed on a user device for submitting a query and receiving a response for the query. The user device is a computing device being used for a user for submitting the queries.

As depicted in FIG. 4, the UI provides a landing page 400 for query management. The landing page 400 enables users to input query and receive responses to their queries. The landing page 400 provides a user-friendly platform, thereby allowing users to submit queries, potentially control or view model parameters, and receive responses from various Gen AI models 116a-116n/information source 106 along with insights into Gen AI model performance.

A left pane of the landing page 400 includes an input panel 402 and an output panel 404. The input panel 402 further includes options such as input prompt 402a, get response 402b, reset 402c, submit feedback and clear 402d, history 402e. Upon selecting the option input prompt 402, query can be inputted by the user. Upon selecting the get response 402b, the proposed method 300 may be initiated for the query processing. Upon selecting the get response 402b option, the response may be generated for the query according to the execution of the proposed method 300. Further, selecting the option: reset 402c, allows the user to clear the current query and start over, providing a fresh query. Selection of the options like the feedback and clear 402d enables the user to submit feedback on accuracy, relevance, or helpfulness of the response generated. The history 402e provide access to a record of past queries and responses, allowing users to review their queries. The output panel 404 displays the generated response to the user's query. Additionally, the output panel 404 displays separate options for each response, potentially from different models. Selecting a specific output option, displays the parameters of the Gen AI model such as response time, tokens, cost and model ID. The response time refers process the query using the Gen AI model. The tokens refer to the number of tokens (words or units) the Gen AI model consumed while processing the query. The cost refers to the estimated cost associated with running the query on the selected Gen AI model. The model ID refers to the ID number associated with the specific Gen AI model that retrieves the response. Further, the right pane of the landing page 400 displays the dynamic parameters specific to custom Gen AI models.

Figure 5:
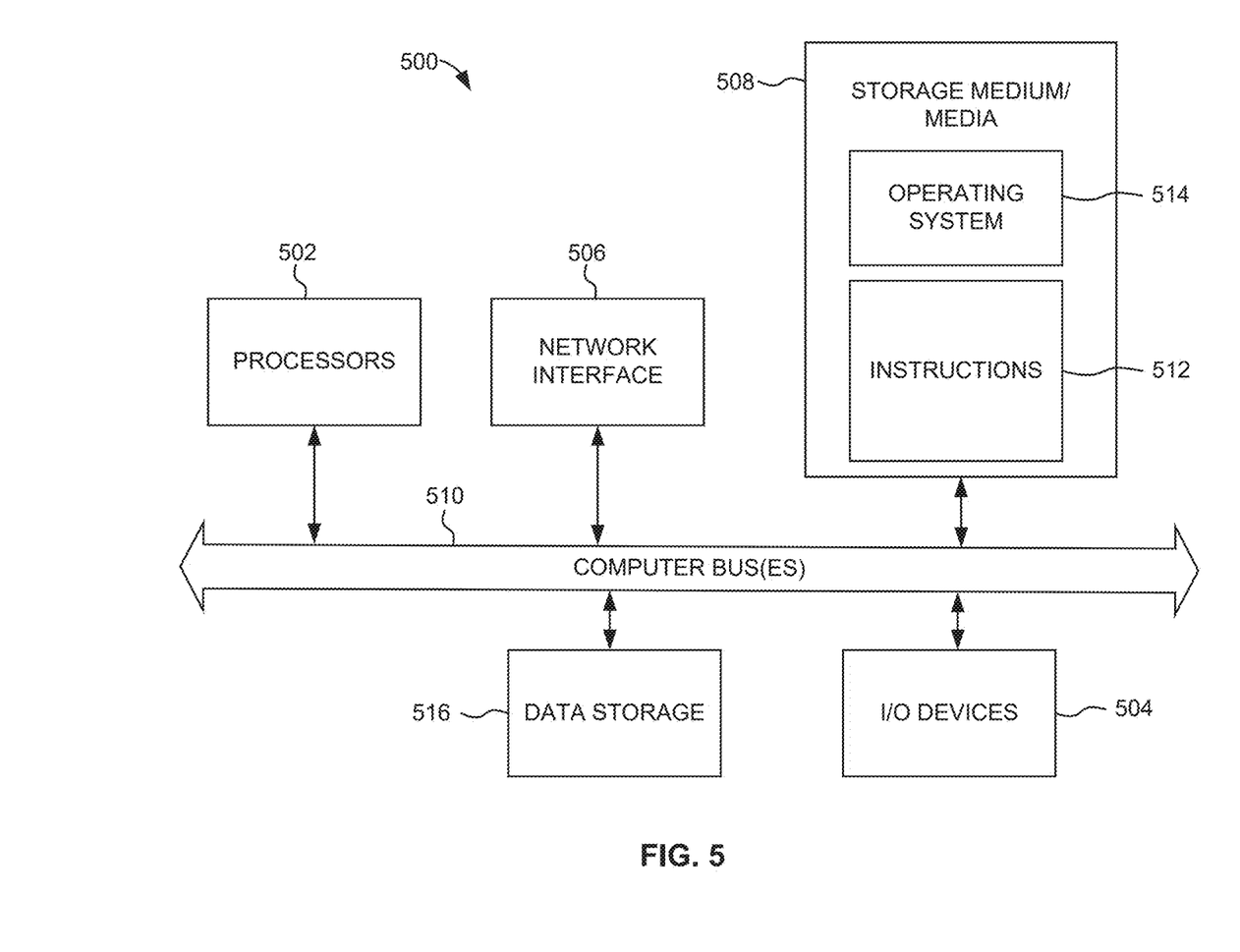
FIG. 5 illustrates a computer system that may be used to implement the query management system.

FIG. 5 illustrates a computer system 500 that may be used to implement the query management system 112. More particularly, computing machines such as desktops, laptops, smartphones, tablets, and wearables which may be used to select the foundation models 116a-116n for the tasks that may have the structure of the computer system 500. The computer system 500 may include additional components not shown and that some of the process components described may be removed and/or modified. In another example, a computer system 500 may be deployed on external-cloud platforms such as cloud, internal corporate cloud computing clusters, organizational computing resources, and/or the like.

The computer system 500 includes processor(s) 502, such as a central processing unit, ASIC or another type of processing circuit, input/output devices 504, such as a display, mouse keyboard, etc., a network interface 506, such as a Local Area Network (LAN), a wireless 802.11x LAN, a 3G or 4G mobile WAN or a WiMax WAN, and a computer-readable medium 508. Each of these components may be operatively coupled to a bus 510. The computer-readable medium 508 may be any suitable medium that participates in providing instructions to the processor(s) 502 for execution. For example, the computer-readable medium 508 may be non-transitory or non-volatile medium, such as a magnetic disk or solid-state non-volatile memory or volatile medium such as RAM. The instructions or modules stored on the computer-readable medium 508 may include machine-readable instructions 512 executed by the processor(s) 502 that cause the processor(s) 502 to perform the methods and functions of the query management system 112.

The query management system 112 may be implemented as software stored on a non-transitory processor-readable medium and executed by the processors 502. For example, the computer-readable medium 508 may store an operating system 514, such as MAC OS, MS WINDOWS, UNIX, or LINUX, and code for the query management system 112. The operating system 514 may be multi-user, multiprocessing, multitasking, multithreading, real-time, and the like. For example, during runtime, the operating system 514 is running and the code for the query management system 112 is executed by the processor(s) 502.

The computer system 500 may include a data storage 516, which may include non-volatile data storage. The data storage 516 stores any data used or generated by the query management system 112.

The network interface 506 connects the computer system 500 to internal systems for example, via a LAN. Also, the network interface 506 may connect the computer system 500 to the Internet. For example, the computer system 500 may connect to web browsers and other external applications and systems via the network interface 506.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term computing system encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:
1. A computer-implemented method comprising:
selecting, by one or more processors of an application server, a model from a catalog of Generative Artificial Intelligence (Gen AI) models including authorized Gen AI models, a default Gen AI model for use with an application executing on the application server, wherein the default Gen AI model is stored at a communicatively coupled location with the one or more processors of the application server, wherein selecting the model includes:
  obtaining ground truth evaluation and a set of metrics associated with the Gen AI models,
  performing evaluation on the set of metrics by evaluating queries provided to the Gen AI models and respective answers received from the Gen AI models in response to the queries provided,
  comparing the evaluation with the ground truth evaluation, and
  generating a result including graphs, charts, and visuals to indicate the Gen AI models suitable for the application;
dynamically routing of a query using a query router, to an appropriate data source that includes one of the authorized Gen AI models, the default Gen AI model, and an information source based on the result of the Gen AI models, wherein the dynamically routing the query comprises;
  receiving, by the one or more processors, the query generated by the application, wherein the query is generated in response to a user query received by the application;
  first determining, by the one or more processors, whether the query includes a request for information that is inappropriate for consideration by any of the authorized Gen AI models of the catalog;
  first submitting, by the one or more processors, in response to the first determining finding that the requested information is inappropriate, at least a portion of the query with the requested information to the information source different from the authorized Gen AI models of the catalog;
  second determining, by the one or more processors, in response to the first determining finding the requested information is appropriate, whether the query meets any predetermined exception to submission to the default Gen AI model;
  second submitting, by the one or more processors, in response to the second determining that the query does not meet the any predetermined exception, the query to the default Gen AI model;
  third submitting, by the one or more processors, in response to the second determining that the query meets the any predetermined exception, the query to a different one of the authorized Gen AI models from the catalog; and
transmitting, by the one or more processors, to a user interface (UI) screen of the application executed on a user device for submitting the user query, an answer to the query based on response to the first submitting, the second submitting, and/or the third submitting, wherein the answer is provided in response to the user query, wherein the answer is generated from one or more tasks being performed using the requested information obtained from at least one of the information source, the default Gen AI model, and one of the authorized Gen AI models.

2. The method of claim 1, wherein the first determining finds the requested information to be inappropriate in response to any of:
  the answer to the query already being available in a stored memory as an answer to an earlier query;
  the requested information being considered unavailable to any of the Gen AI models of the catalog; and/or
  the requested information being considered unavailable to the default Gen AI model.

3. The method of claim 1, wherein the first submitting comprises requesting the requested information from stored memory, a non-Gen AI model, and/or a non-Gen AI query system.

4. The method of claim 1, wherein the second submitting includes submitting the query along with any requested information returned from the first submitting.

5. The method of claim 1, wherein the third submitting includes submitting the query along with any requested information returned from the first submitting.

6. The method of claim 1, wherein:
  the exceptions define a specific query type is to be processed by an alternative model from the authorized Gen AI models and the alternative model requiring less resources to answer the query than the default Gen AI model.

7. The method of claim 6, wherein the second determining finds the query meets the any predetermined exception in response to the query corresponding to the specific query type.

8. A system comprising:
a processor;
a non-transitory computer readable memory storing instructions programmed to cooperate with the processor to cause the system to perform operations comprising:
  selecting, a model from a catalog of Generative Artificial Intelligence (Gen AI) models including authorized Gen AI models, a default Gen AI model for use with an application executing on the system, wherein the default Gen AI model is stored at a communicatively coupled location with the processor, wherein the selecting comprises:
    obtaining ground truth evaluation and a set of metrics associated with the Gen AI models;
    performing evaluation on the set of metrics by evaluating queries provided to the Gen AI models and respective answers received from the Gen AI models in response to the queries provided;
    comparing the evaluation with the ground truth evaluation; and
    generating a result including graphs, charts, and visuals to indicate the Gen AI models suitable for the application;
  dynamically routing of a query using a query router, to an appropriate data source that includes one of the authorized Gen AI models, the default Gen AI model, and an information source based on the result of the Gen AI models, wherein the dynamically routing the query comprises:
    receiving the query generated by the application, wherein the query is generated in response to a user query received by the application;
    first determining whether the query includes a request for information that is inappropriate for consideration by any of the authorized Gen AI models of the catalog;
    first submitting, in response to the first determining finding that the requested information is inappropriate, at least a portion of the query with the requested information to the information source different from the authorized Gen AI models of the catalog;
    second determining, in response to the first determining finding the requested information is appropriate, whether the query meets any predetermined exception to submission to the default Gen AI model;

second submitting, in response to the second determining that the query does not meet the any predetermined exception, the query to the default Gen AI model;

third submitting, in response to the second determining that the query meets the any predetermined exception, the query to a different one of the Gen AI models from the catalog; and transmitting, to a user interface (UI) screen of the application executed on a user device for submitting the user query, an answer to the query based on response to the first submitting, the second submitting, and/or the third submitting, wherein the answer is provided in response to the user query, wherein the answer is generated from one or more tasks being performed using the requested information obtained from at least one of the information source, the default Gen AI model, and one of the authorized Gen AI models.

9. The system of claim 8, wherein the first determining finds the requested information to be inappropriate in response to any of:

the answer to the query already being available in a stored memory as an answer to an earlier query;

the requested information being considered unavailable to any of the Gen AI models of the catalog; and/or the requested information being considered unavailable to the default Gen AI model.

10. The system of claim 8, wherein the first submitting comprises requesting the requested information from stored memory, a non-open AI model, and/or a non-AI query system.

11. The system of claim 8, wherein the second submitting includes submitting the query along with any requested information returned from the first submitting.

12. The system of claim 8, wherein the third submitting includes submitting the query along with any requested information returned from the first submitting.

13. The system of claim 8, wherein:

the exceptions define a specific query type is to be processed by an alternative model from the authorized Gen AI models and the alternative model requiring less resources to answer the query than the default Gen AI model.

14. The system of claim 13, wherein the second determining finds the query meets the any predetermined exception in response to the query corresponding to the specific query type.

15. A non-transitory computer readable media storing instructions programmed to cooperate with a processor of a computer system to cause the computer system to perform operations comprising:

selecting a model from a catalog of Generative Artificial Intelligence (Gen AI) models including authorized Gen AI models, a default Gen AI model for use with an application executing on the computer system, wherein the default Gen AI model is stored at a communicatively coupled location with the processor of the computer system, and wherein selecting the model includes:

obtaining ground truth evaluation and a set of metrics associated with the Gen AI models, performing evaluation on the set of metrics by evaluating queries provided to the Gen AI models and respective answers received from the Gen AI models in response to the queries provided, comparing the evaluation with the ground truth evaluation, and generating a result including graphs, charts, and visuals to indicate the Gen AI models suitable for the application;

dynamically routing of a query using a query router, to an appropriate data source that includes one of the authorized Gen AI models, the default Gen AI model, and an information source based on the result of the Gen AI models, wherein the dynamically routing the query comprises:

receiving the query generated by the application, wherein the query is generated in response to a user query received by the application;

first determining whether the query includes a request for information that is inappropriate for consideration by any of the authorized Gen AI models of the catalog;

first submitting, in response to the first determining finding that the requested information is inappropriate, at least a portion of the query with the requested information to an information source different from the authorized Gen AI models of the catalog;

second determining, in response to the first determining finding the requested information is appropriate, whether the query meets any predetermined exception to submission to the default Gen AI model;

second submitting, in response to the second determining that the query does not meet the any predetermined exception, the query to the default Gen AI model;

third submitting, in response to the second determining that the query meets the any predetermined exception, the query to a different one of the authorized Gen AI models from the catalog; and transmitting, to a user interface (UI) screen of the application executed on a user device for submitting the user query, an answer to the query based on response to the first submitting, the second submitting, and/or the third submitting, wherein the answer is provided in response to the user query, wherein the answer is generated from one or more tasks being performed using the requested information obtained from at least one of the information source, the default Gen AI model, and one of the authorized Gen AI models.

16. The non-transitory computer readable media of claim 15, wherein the first determining finds the requested information to be inappropriate in response to any of:

the answer to the query already being available in a stored memory as an answer to an earlier query;

the requested information being considered unavailable to any of the Gen AI models of the catalog; and/or the requested information being considered unavailable to the default Gen AI model.

17. The non-transitory computer readable media of claim 15, wherein the first submitting comprises requesting the requested information from stored memory, a non-open AI model, and/or a non-Gen AI query system.

18. The non-transitory computer readable media of claim 15, wherein the second submitting includes submitting the query along with any requested information returned from the first submitting.

19. The non-transitory computer readable media of claim 15, wherein the third submitting includes submitting the query along with any requested information returned from the first submitting.

20. The non-transitory computer readable media of claim 15, wherein:

the exceptions define a specific query type is to be processed by an alternative model from the authorized Gen AI models and the alternative model requiring less resources to answer the query than the default Gen AI model.

* * * * *